United States Patent
Chang et al.

(10) Patent No.: US 10,093,047 B2
(45) Date of Patent: Oct. 9, 2018

(54) METHOD OF MANUFACTURING GLASS FIBER PRODUCT AND PORTABLE ELECTRONIC DEVICE

(71) Applicant: Getac Technology Corporation, Hsinchu County (TW)

(72) Inventors: Juei-Chi Chang, Taipei (TW); James Hwang, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 520 days.

(21) Appl. No.: 14/887,183

(22) Filed: Oct. 19, 2015

(65) Prior Publication Data
US 2016/0039131 A1 Feb. 11, 2016

Related U.S. Application Data

(62) Division of application No. 13/786,089, filed on Mar. 5, 2013.

(30) Foreign Application Priority Data

Jan. 10, 2013 (CN) .......................... 2013 1 0008261

(51) Int. Cl.
 *B29C 45/00* (2006.01)
 *B29C 45/16* (2006.01)
 (Continued)

(52) U.S. Cl.
 CPC ...... *B29C 45/0055* (2013.01); *B29C 45/0005* (2013.01); *B29C 45/1676* (2013.01); *B29C 69/001* (2013.01); *B29C 45/0001* (2013.01); *B29C 45/14336* (2013.01); *B29C 45/73* (2013.01); *B29C 2045/7356* (2013.01); *B29C 2793/00* (2013.01); *B29K 2101/12* (2013.01); *B29K 2105/12* (2013.01);
 (Continued)

(58) Field of Classification Search
 None
 See application file for complete search history.

(56) References Cited

U.S. PATENT DOCUMENTS

| | | |
|---|---|---|
| 2004/0063824 A1 | 4/2004 | Takagi et al. |
| 2006/0261528 A1 | 11/2006 | Cheng et al. |

(Continued)

FOREIGN PATENT DOCUMENTS

CN    102558838 A    7/2012

OTHER PUBLICATIONS translation of CN 102558838.*
(Continued)

*Primary Examiner* — Mary Lynn F Theisen

(57) ABSTRACT

A manufacturing method of a glass fiber product is disclosed. A glass fiber resin is provided. The glass fiber resin includes a thermoplastic resin, a glass fiber, and an additive. The amount of the thermoplastic resin is between 30 wt % and 70 wt %, the content of the glass fiber is between 40 wt % and 70 wt % and the amount of the additive is between 0.1 wt % and 15 wt %. A molding process is performed for the glass fiber resin to mold the glass fiber resin into a semi-finished product. A mechanical machining process is performed on the semi-finished product to form at least one recessed structure in the semi-finished product, so as to form a final product.

15 Claims, 8 Drawing Sheets

(51) Int. Cl.
*B29C 69/00* (2006.01)
*B29L 31/34* (2006.01)
*B29C 45/14* (2006.01)
*B29C 45/73* (2006.01)
*B29K 101/12* (2006.01)
*B29K 105/12* (2006.01)
*B29K 509/08* (2006.01)

(52) U.S. Cl.
CPC .... *B29K 2509/08* (2013.01); *B29K 2995/007* (2013.01); *B29L 2031/3481* (2013.01); *Y10T 428/1314* (2015.01)

(56) References Cited

U.S. PATENT DOCUMENTS

| | | |
|---|---|---|
| 2010/0270189 A1 | 10/2010 | Pedersen et al. |
| 2011/0274944 A1* | 11/2011 | Elia ................ B29C 45/0001 428/626 |
| 2012/0076573 A1* | 3/2012 | Pilliod ............. B29C 45/0005 403/265 |
| 2012/0097412 A1* | 4/2012 | Wennemer ........... B29C 43/02 174/50 |

OTHER PUBLICATIONS

"Technology Development and Application of High Glass Fiber Reinforced Plastic Chassis," DIGITIMES Exhibition Special Reports COMPUTEX 2013 Jul. 2012, 4 pages, DIGITIMES, Taiwan.

* cited by examiner

METHOD OF MANUFACTURING GLASS FIBER PRODUCT AND PORTABLE ELECTRONIC DEVICE

BACKGROUND OF THE INVENTION

1. Field of the Invention

The invention generally relates to a manufacturing method of a plastic product, and more particularly, to a manufacturing method of a glass fiber product and a portable electronic device.

2. Description of Related Art

Along with the development of technologies, the design of electronic products has been going towards light weight and slimness. Presently, the casings of electronic products are usually made of plastic materials. Such materials are inexpensive but cannot be made too thin due to the limitation in their rigidity. Additionally, in a conventional plastic molding process, the mold adopted has a complicated structure, and accordingly it takes a long time to make the mold. Besides, it is time-consuming and inflexible to modify the internal structure of the mold. Due to the complicated mold structure, a product cannot be integrally manufactured by using the mold. Namely, the mold offers a low applicability.

In addition, the conventional plastic injection molding technology is to inject a melted plastic material into a mold at about 40-50° C. and unload the mold after the plastic material cools down. However, if a semi crystalline material is used and cannot be controlled to cool down at above the crystallizing temperature thereof, the problem of nonuniform deformation may be produced in the finished products. Moreover, the conventional plastic injection molding technology achieves the heating effect through water or oil. However, when the manufacturing temperature of the conventional plastic injection molding needs to go over 100° C., the water heating and oil heating occur some problems. For example, the water may exist in liquid and vapor phases (not in pure liquid) in the water pipe at a temperature over 100° C., and the mold will not be under uniform heating. In the oil heating process, oil leakage thru the oil pipe may occur and damage the mold. Thereby, many problems as mentioned in above manufacturing processes need to be resolved.

SUMMARY OF THE INVENTION

Accordingly, the invention is directed to a manufacturing method of a glass fiber product, in which a semi-finished product is first fabricated through a molding process, and then the final product is manufactured through a mechanical machining process.

The invention is directed to a portable electronic device which includes a glass fiber product manufactured through the manufacturing method provided by the invention.

The invention provides a manufacturing method of a glass fiber product. In the manufacturing method, a glass fiber resin is provided. The glass fiber resin includes a thermoplastic resin, a glass fiber, and an additive. The thermoplastic resin has an amount between 30 wt % and 70 wt %, the glass fiber has an amount between 40 wt % and 70 wt %, and the additive has an amount between 0.1 wt % and 15 wt %. A molding process is performed for the glass fiber resin to mold the glass fiber resin into a semi-finished product. A mechanical machining process is performed on the semi-finished product to form at least one recessed structure in the semi-finished product, so that a final product is formed.

The invention provides a portable electronic device. The portable electronic device includes a casing, a thermoplastic elastomer, and a display device. The casing has a containing space. The thermoplastic elastomer is disposed at at least one stress concentration position on the casing. The display device is disposed in the containing space. The casing includes a thermoplastic resin, a glass fiber, and an additive. The thermoplastic resin has an amount between 30 wt % and 70 wt %, the glass fiber has an amount between 40 wt % and 70 wt %, and the additive has an amount between 0.1 wt % and 15 wt %.

As described above, in the manufacturing method of a glass fiber product provided by the invention, a semi-finished product is first fabricated through a molding process by using the rigidity of a glass fiber resin similar to that of a metal, and a final product is then manufactured through a mechanical machining process, so that the complexity of the mold is effectively reduced, the lifespan of the mold is prolonged, the manufacturing process is sped up, the manufacturing cost is reduced, and the production yield rate is increased.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
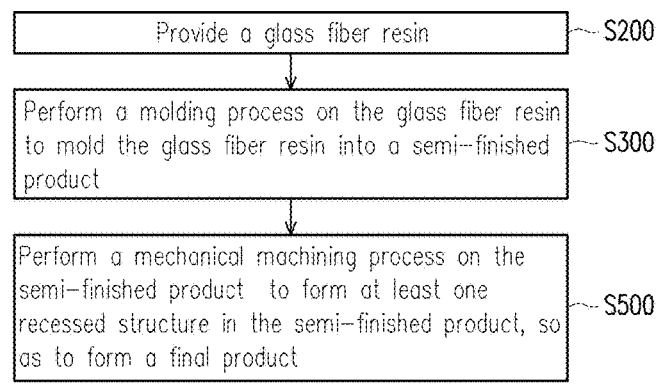
FIG. 1 is a flowchart of a manufacturing method of a glass fiber product according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a flowchart of a manufacturing method of a glass fiber product according to an embodiment of the invention.

Figure 2A:
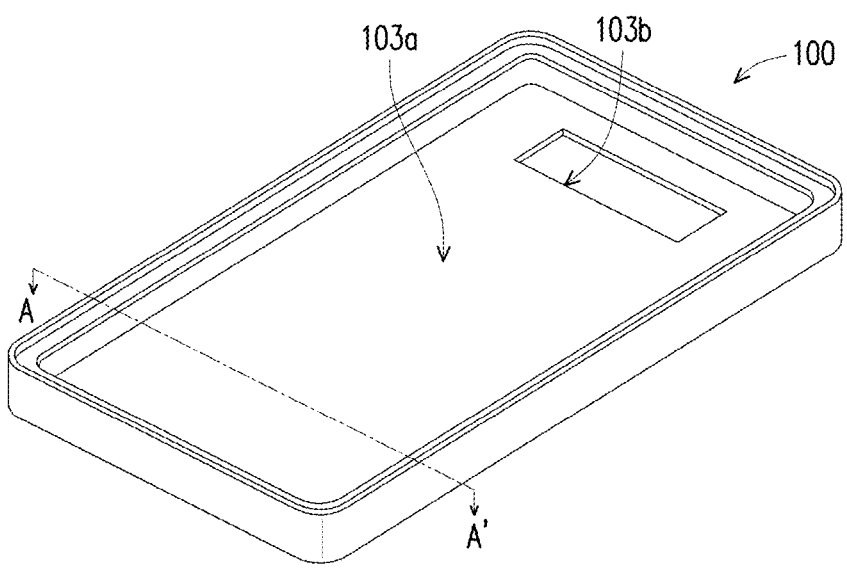
FIG. 2A and FIG. 2B are perspective views illustrating a manufacturing procedure of a glass fiber product according to an embodiment of the invention.
Figure 2B:
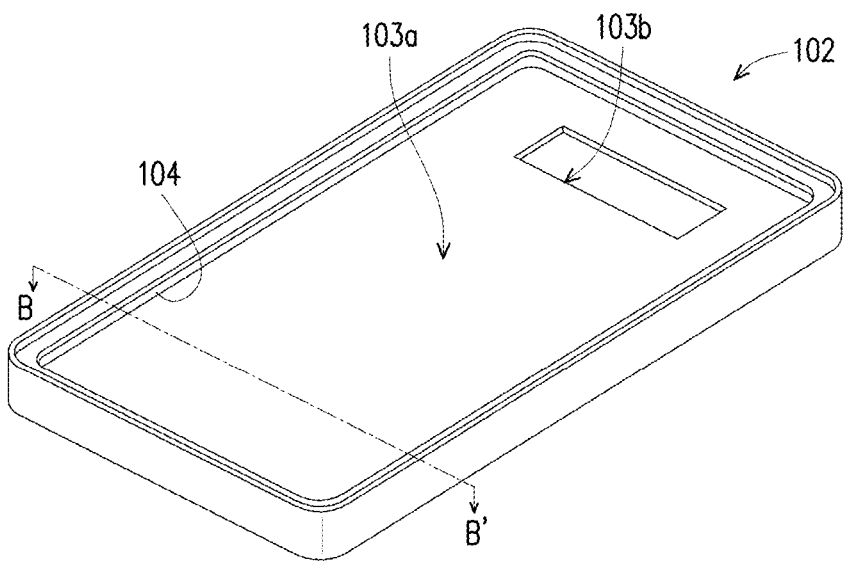
Figure 3A:
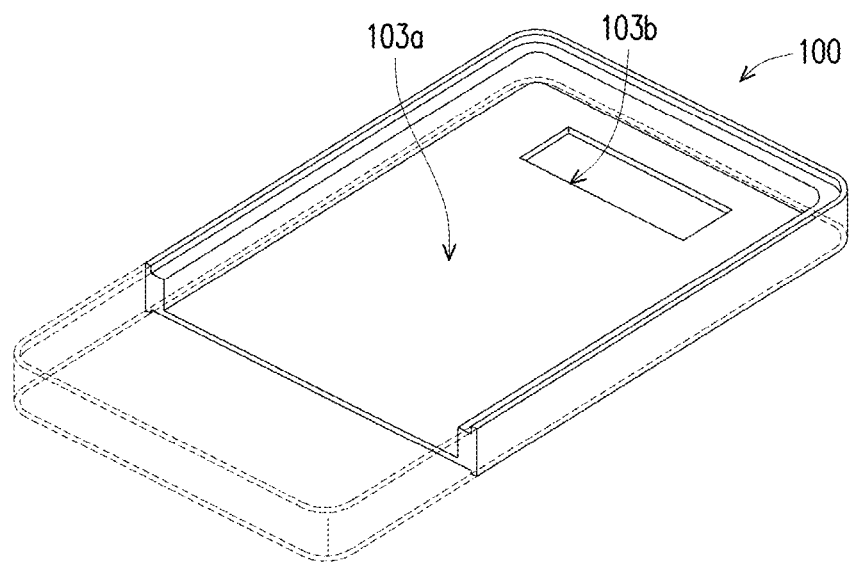
FIG. 3A and FIG. 3B are perspective cross-sectional views illustrating a manufacturing procedure of a glass fiber product according to an embodiment of the invention.
Figure 3B:
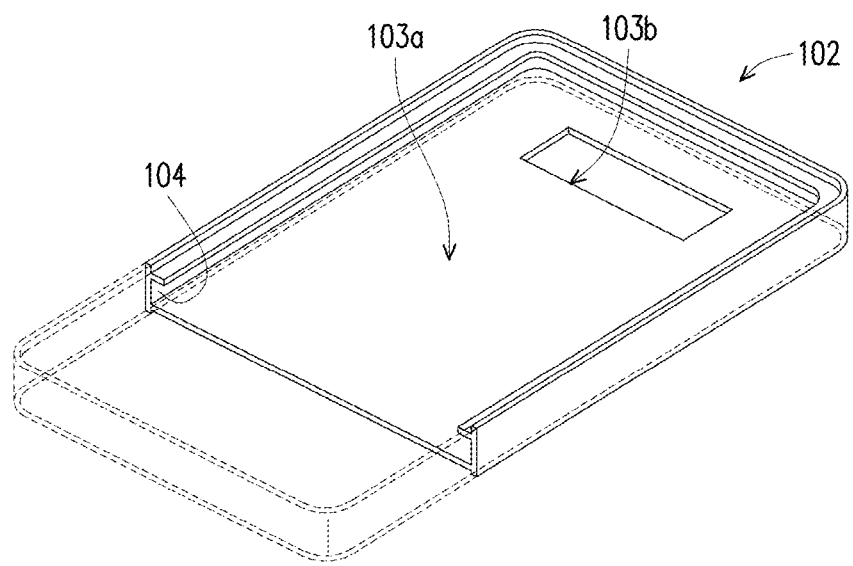

FIG. 2A and FIG. 2B are perspective views illustrating a manufacturing procedure of a glass fiber product according to an embodiment of the invention. FIG. 3A and FIG. 3B are perspective cross-sectional views illustrating a manufacturing procedure of a glass fiber product according to an embodiment of the invention, where FIG. 3A is a cross-sectional view of the glass fiber product along line A-A' in FIG. 2A, and FIG. 3B is a cross-sectional view of the glass fiber product along line A-A' in FIG. 2B. It should be noted that FIG. 2A, FIG. 2B, FIG. 3A, and FIG. 3B are only used for describing embodiments of the invention but not intended to limit the scope of the invention.

First, referring to FIG. 1, in step S200, a glass fiber resin is provided. The components of the glass fiber resin include a thermoplastic resin, a glass fiber, and an additive. Below, these components of the glass fiber resin will be respectively described in detail.

The amount of the thermoplastic resin is between 30 wt % and 70 wt % based on a total weight of the glass fiber resin. In an embodiment, the amount of the thermoplastic resin is between 35 wt % and 50 wt % based on a total weight of the glass fiber resin. The material of the thermoplastic resin is selected from a group consisting of polycarbonate (PC), polyamide (PA), polypropylene (PP), acrylonitrile butadiene-styrene (ABS), polyphenyl ether (PPE), thermoplastic urethane (TPU), and polyphenylene sulphide (PPS). Herein PP, ABS, and TPU are suitable for applications requiring long glass fiber reinforced materials. Generally, the glass fiber length of a long glass fiber reinforced material is between 9 cm and 12 cm, while the glass fiber length of a short glass fiber reinforced material is between 3 cm and 5 cm.

The amount of the glass fiber is between 40 wt % and 70 wt % based on a total weight of the glass fiber resin. In an embodiment, the amount of the glass fiber is between 45 wt % and 55 wt % based on a total weight of the glass fiber resin. When the amount of the glass fiber is lower than 40 wt %, the glass fiber resin is not rigid enough. When the amount of the glass fiber is higher than 70 wt %, the glass fiber cannot be well bonded with the thermoplastic resin. As a result, the rigidity of the glass fiber resin cannot be effectively increased, and the glass fiber resin may become brittle. Namely, the glass fiber resin in the invention can only achieve the desired functions when the thermoplastic resin is well bonded with the glass fiber, where the glass fiber is adopted for improving the rigidity of the thermoplastic resin. The glass fiber may be a flat glass fiber, a round glass fiber, or a combination of aforementioned two types of glass fiber. Herein the flat glass fiber is suitable for applications regarding thin products, such as large-area flat panels.

In addition, the mechanical property (for example, flexibility, impact strength, or tensile strength) of the glass fiber resin varies with the selection of the thermoplastic resin, and if the glass fiber resin contains no thermoplastic resin, it cannot be used in the manufacturing of a glass fiber product. Thus, the thermoplastic resin is regarded as the main material even if the amount of the glass fiber reaches 70 wt % and the amount of the thermoplastic resin is lower than 50 wt %.

The amount of the additive is between 0.1 wt % and 15 wt % based on a total weight of the glass fiber resin. The additive is selected from a group consisting of a flame retardant, an antioxidant, a coupling agent, a processing aid, a toughener, a compatilizer, and a mineral filler.

In an embodiment, regarding the weight percentage in the glass fiber resin, the amount of PPS is between 5% and 60%, the amount of PPE is between 5% and 30%, the amount of the flat glass fiber is between 10% and 60%, the amount of the mineral filler is between 0 and 10%, the amount of the coupling agent is between 0.1% and 3%, and the amount of the processing aid is between 0.1% and 2%.

Then, referring to step S300 in FIG. 1, FIG. 2A, and FIG. 3A, a molding process is performed for the glass fiber resin to mold the glass fiber resin into a semi-finished product 100. In the present embodiment, the molding process is a rapid heat cycle molding (RHCM) process adopting a temperature jump technique. After the mold temperature reaches the high temperature configured to react the glass fiber resin, the glass fiber resin is injected into the mold and then quickly cooled down to around room temperature. After that, a finished-product can be unloaded from the mold. Compared to the conventional injection molding process, the RHCM process allows the glass fiber resin which has a molding temperature as high as 130° C. to 140° C. to be effectively molded and won't cause any fiber floating problem or welding line exposure problem on the surface (i.e., provides a glossy surface). In addition, the completeness of the semi-finished product 100 is 70% to 80% of the final product (fabricated in subsequent process). Namely, in the invention, a glass fiber resin is initially and roughly molded through a molding process by using a simple mold. In the present embodiment, as shown in FIG. 2A, a containing space 103a and an opening 103b in the containing space 103a are formed in the semi-finished product 100. Both the containing space 103a and the opening 103b are large-area and simple structures therefore can be directly formed through the molding process, while the other fine and complicated structures are formed in subsequent process. Thereby, the mold is simplified. Accordingly, the cost of the mold is reduced, the lifespan thereof is prolonged, and the manufacturing process is sped up. In addition, the rigidity of the semi-finished product 100 made of the glass fiber resin is similar to the rigidity of a metal.

Next, referring to step S500 in FIG. 1, FIG. 2B, and FIG. 3B, a mechanical machining process is performed on the semi-finished product 100 to form at least one recessed structure 104 in the semi-finished product 100, so that a final product 102 is formed. The mechanical machining process is carried out by using a computer numerical control (CNC) machine. The recessed structure 104 may be a slot, a groove, a broken hole, or a through hole. As shown in FIG. 2B, after the semi-finished product 100 is formed, the mechanical machining process is performed on the semi-finished product 100 to form the fine and complicated recessed structure 104. Namely, based on the fact that the rigidity of the semi-finished product 100 is similar to that of metal, the recessed structure 104, which cannot be effectively formed or cannot be formed in the molding process, can be effectively formed on the semi-finished product 100 through the mechanical machining process so that the final product 102 is formed.

As described in foregoing embodiment, a glass fiber resin is roughly molded through a molding process based on the fact that the rigidity thereof is similar to that of metal, and then a final product is fabricated through a mechanical machining process, so that the mold is effectively simplified, the lifespan thereof is prolonged, the manufacturing process is sped up, the manufacturing cost is reduced, and the production yield rate is increased.

Figure 4:
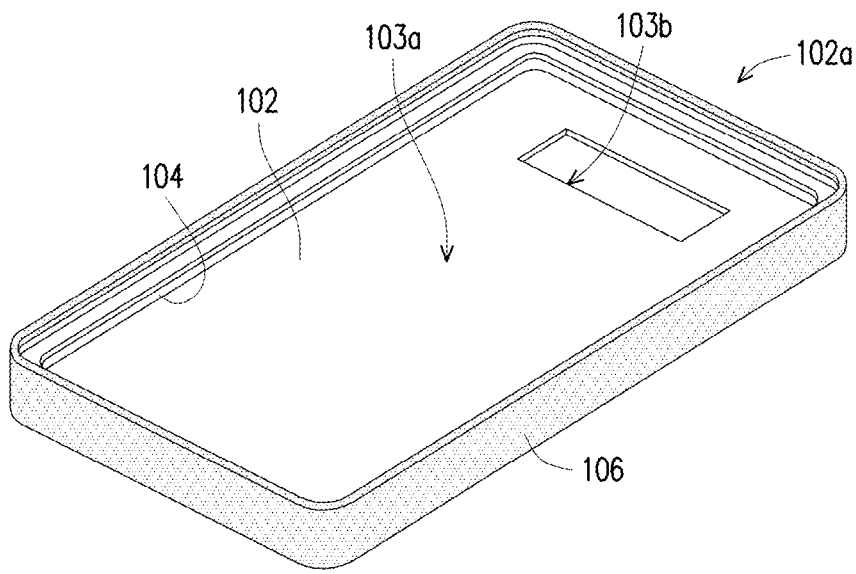
FIG. 4 is a perspective view of a glass fiber product according to another embodiment of the invention.

FIG. 4 is a perspective view of a glass fiber product according to another embodiment of the invention. It should be noted that FIG. 4 is only used for describing an embodiment of the invention but not intended to limit the scope of the invention.

Referring to both FIG. 2B and FIG. 4, the only difference between the final product 102 in FIG. 2B and the final product 102a in FIG. 4 is that the final product 102a further includes a thermoplastic elastomer 106 covering the exterior of the final product 102. The thermoplastic elastomer 106 is selected from a group composed of PA thermoplastic elastomer, polyester thermoplastic elastomer, polyolefin thermoplastic elastomer, and styrene thermoplastic elastomer. The Shore hardness of the thermoplastic elastomer 106 is between 40 Shore D and 80 Shore D. If expressed in another test pattern, the Shore hardness of the thermoplastic elastomer 106 is between 50 Shore A and 95 Shore A.

To be specific, in the present embodiment, the final product 102 is considered the major structure, and the flexible thermoplastic elastomer 106 is formed at a stress concentration position on the final product 102, so that a final product 102a having both the rigidity of the final product 102 and the flexibility of the thermoplastic elastomer 106 is achieved. Additionally, by forming the thermoplastic elastomer 106 at the stress concentration position, the impact of any crash at the stress concentration position can be effectively reduced, so that the final product 102a can achieve a crash-proof feature. Herein the stress concentration position may be a corner. Thus, even though the thermoplastic elastomer 106 covers the entire external surface of the final product 102 in FIG. 4, the invention is not limited thereto, and it is within the scope of the invention as long as a thermoplastic elastomer 106 is formed at the stress concentration position on the final product 102. In addition, because the thermoplastic elastomer 106 offers a high hardness and the final product 102 offers a high rigidity, similar senses of touch can be achieved on the junction portion between the thermoplastic elastomer 106 and the final product 102 after the thermoplastic elastomer 106 and the final product 102 are bonded together. Accordingly, the thermoplastic elastomer 106 and the final product 102 appear to be a single piece after they are spray painted together.

The method of manufacturing the final product 102a in FIG. 4 can be achieved by simply adding the step of forming the thermoplastic elastomer 106 into the method of manufacturing the final product 102 in FIG. 1. Below, how the final product 102a with the thermoplastic elastomer 106 is manufactured through the manufacturing method of the glass fiber product in the embodiment described above will be described in detail with reference to various embodiments of the invention.

FIG. 5 to FIG. 8 are flowcharts of a manufacturing method of a glass fiber product according to other embodiments of the invention. Those steps in FIG. 5 to FIG. 8 that are the same as those in FIG. 1 are marked with the same reference numbers and will not be described in detail herein.

Figure 5:
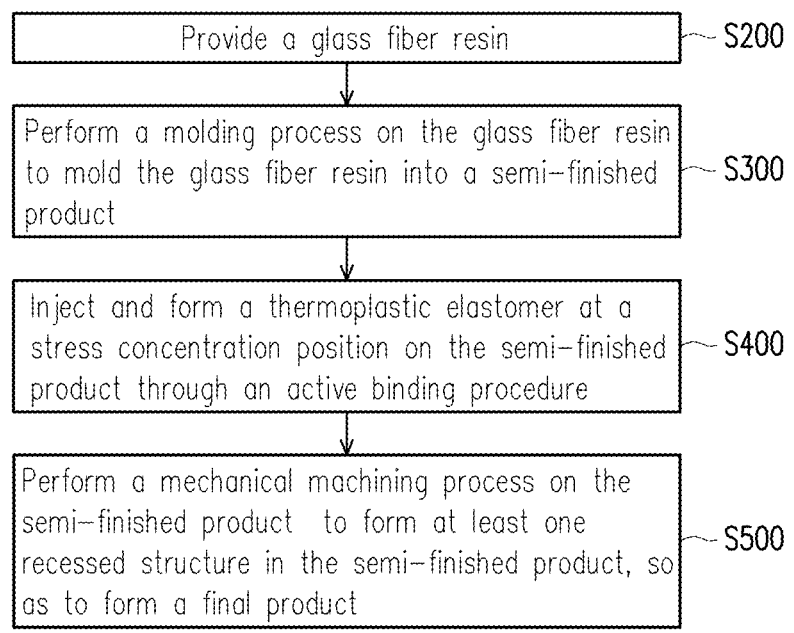
FIG. 5 to FIG. 8 are flowcharts of a manufacturing method of a glass fiber product according to other embodiments of the invention.

Referring to both FIG. 1 and FIG. 5, the only difference between the method of manufacturing the final product 102 in FIG. 1 and the method of manufacturing the final product 102a in FIG. 5 is that in the latter one, a step S400 is further comprised between step S300 and step S500. In step S400, the thermoplastic elastomer 106 is injected and formed at a stress concentration position on the semi-finished product 100 through an active binding procedure. The active binding procedure is to bond the surface of the semi-finished product 100 and the surface of the thermoplastic elastomer 106 based on the fact that the surface material molecules of the semi-finished product 100 and the thermoplastic elastomer 106 have the same activity or by applying a crosslinking agent or an adhesive to the junction between the semi-finished product 100 and the thermoplastic elastomer 106.

Figure 6:
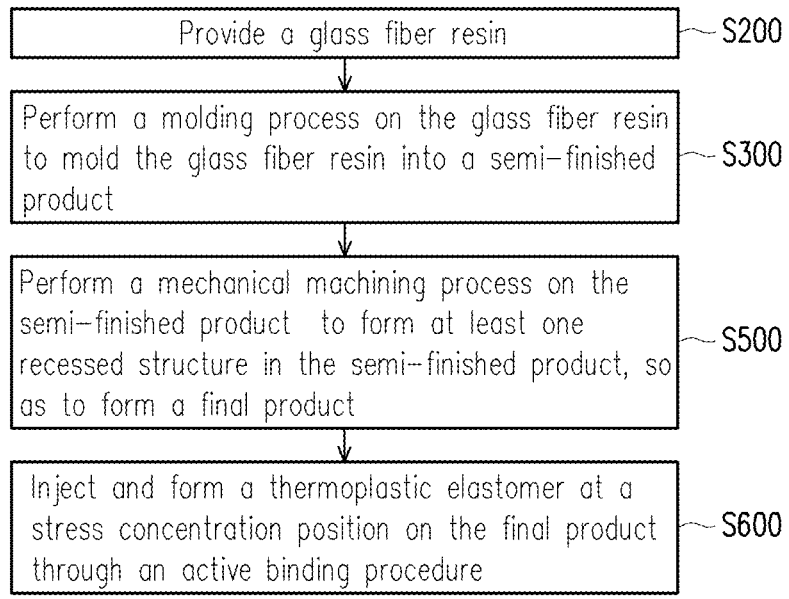

Referring to both FIG. 1 and FIG. 6, the only difference between the method of manufacturing the final product 102 in FIG. 1 and the method of manufacturing the final product 102a in FIG. 6 is that in the latter one, a step S600 is further comprised after step S500 In step S600 the thermoplastic elastomer 106 is injected and formed at a stress concentration position on the final product 102 through an active binding procedure, so that the final product 102a is formed. The active binding procedure is to bond the surface of the final product 102 and the surface of the thermoplastic elastomer 106 based on the fact that the surface material molecules of the final product 102 and the thermoplastic elastomer 106 have the same activity or by applying a crosslinking agent or an adhesive to the junction between the final product 102 and the thermoplastic elastomer 106.

As shown in FIG. 5 and FIG. 6, the step of forming the thermoplastic elastomer 106 (steps S400 and S600) can be executed after the step of forming the semi-finished product 100 or the step of forming the final product 102. Thus, the manufacturing method of a glass fiber product provided by the invention can be adjusted according to the actual process or product requirement to offer improved applicability.

Figure 7:
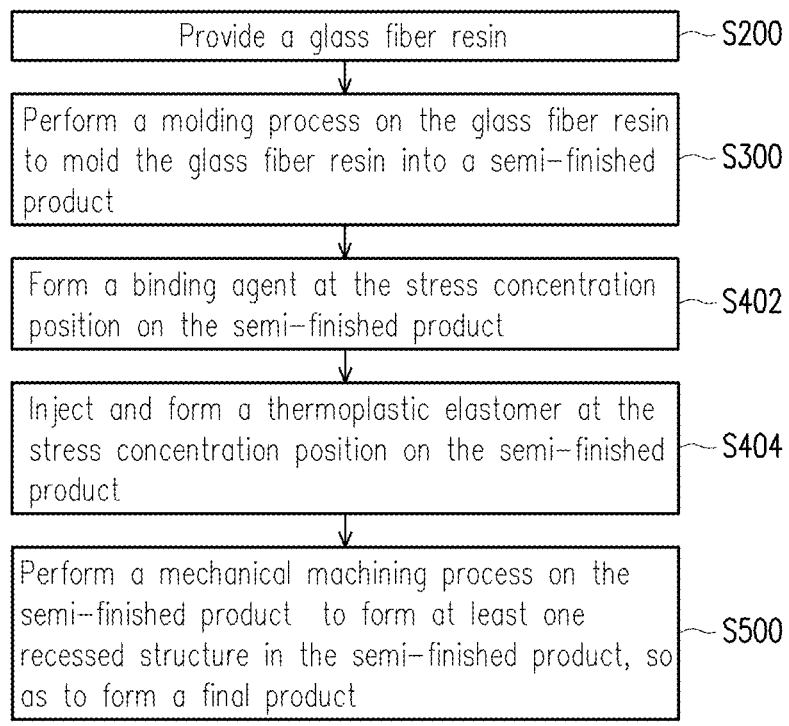

Referring to both FIG. 1 and FIG. 7, the only difference between the method of manufacturing the final product 102 in FIG. 1 and the method of manufacturing the final product 102a in FIG. 7 is that in the latter one, following steps are further comprised between the step S300 and the step S500. In step S402, a binding agent is formed at the stress concentration position on the semi-finished product 100. The binding agent is a low-molecular weight compound carrying a functional group, such as epoxy group, anhydride group, amide group, carboxy group, acrylic group, or polyurethane group. In next step S404, the thermoplastic elastomer 106 is injected and formed at the stress concentration position on the semi-finished product 100 (i.e., the thermoplastic elastomer 106 and the semi-finished product 100 are bonded together by using the binding agent).

Figure 8:
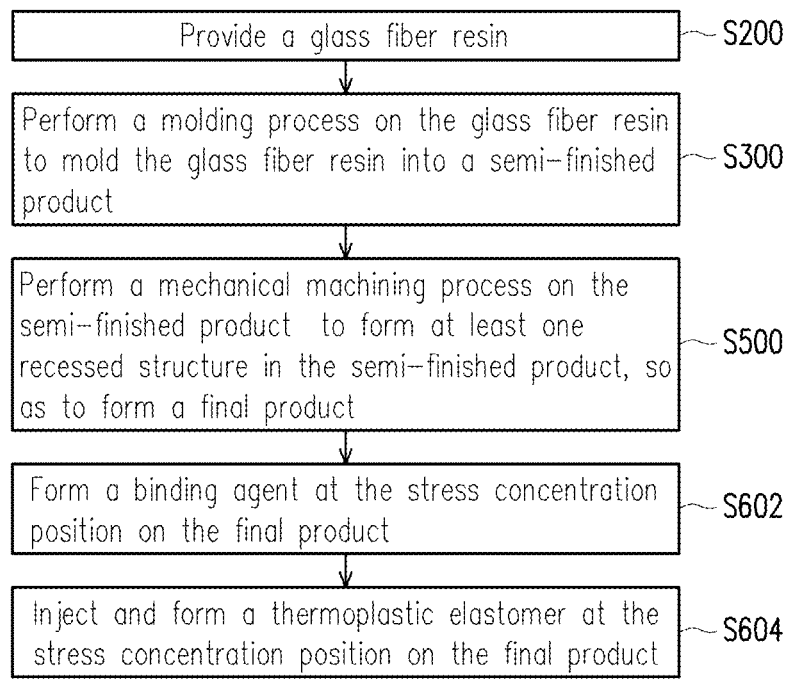

Referring to both FIG. 1 and FIG. 8, the only difference between the method of manufacturing the final product 102 in FIG. 1 and the method of manufacturing the final product 102a in FIG. 8 is that in the latter one, following steps are further comprised after step S500. In step S602, a binding agent is formed at the stress concentration position on the final product 102. The binding agent is a low-molecular weight compound carrying a functional group, such as epoxy group, anhydride group, amide group, carboxy group, acrylic group, or polyurethane group. In next step S604, the thermoplastic elastomer 106 is injected and formed at the stress concentration position on the final product 102 (i.e., the thermoplastic elastomer 106 and the final product 102 are bonded together by using the binding agent), so that the final product 102a is formed.

As shown in FIG. 7 and FIG. 8, the step of forming the thermoplastic elastomer 106 (steps S402 and S404, and steps S602 and S604) can be executed after the step of forming the semi-finished product 100 or the step of forming the final product 102. Thus, the manufacturing method of a glass fiber product provided by the invention can be adjusted according to the actual process or product requirement to offer improved applicability.

Figure 9:
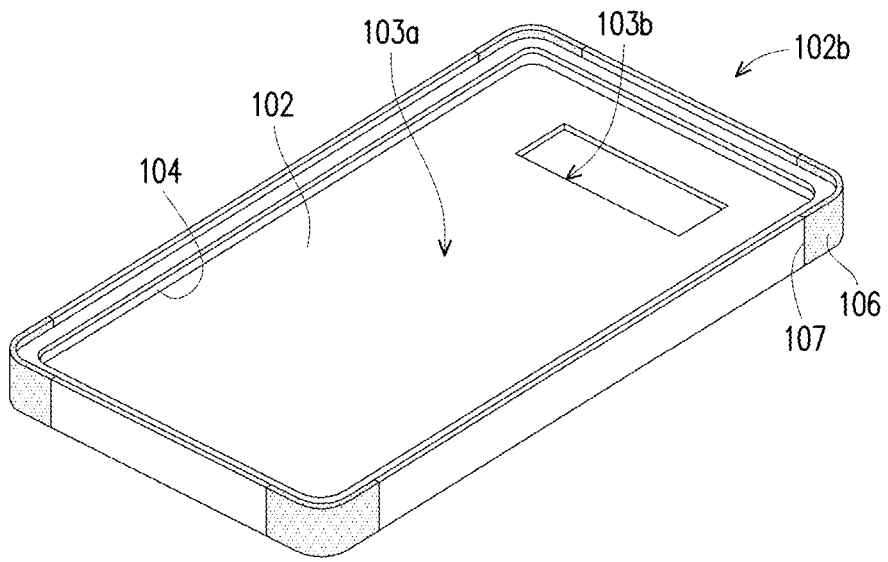
FIG. 9 is a perspective view of a glass fiber product according to yet another embodiment of the invention.

FIG. 9 is a perspective view of a glass fiber product according to yet another embodiment of the invention. Those components in FIG. 9 that are similar to those in FIG. 4 are marked with the same reference numbers and will not be described again. It should be noted that FIG. 9 is only used for describing the present embodiment but not intended to limit the scope of the invention.

Referring to both FIG. 4 and FIG. 9, the only difference between the final product 102a in FIG. 4 and the final product 102b in FIG. 9 is the style of the thermoplastic elastomer 106. In FIG. 4, the thermoplastic elastomer 106 covers the entire external surface of the final product 102a. In FIG. 9, the thermoplastic elastomers 106 are separately formed on the corners of the final product 102 to integrally form a final product 102b. The manufacturing method of the final product 102b will be described below. In addition, even though the thermoplastic elastomers 106 are formed on the corner of the final product 102b in FIG. 9, the invention is not limited thereto, and it is within the scope of the invention as long as the thermoplastic elastomers 106 are formed at the stress concentration positions on the final product 102b.

Figure 10:
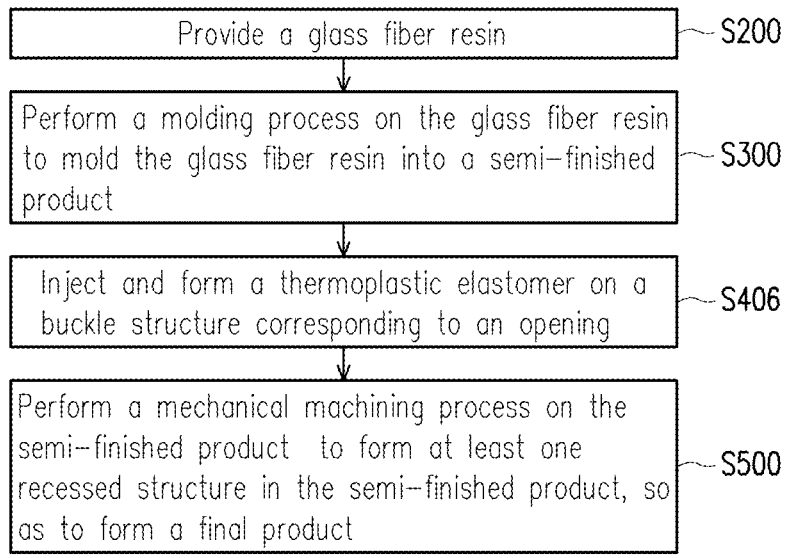
FIG. 10 and FIG. 11 are flowcharts of a manufacturing method of a glass fiber product according to other embodiments of the invention.
Figure 11:
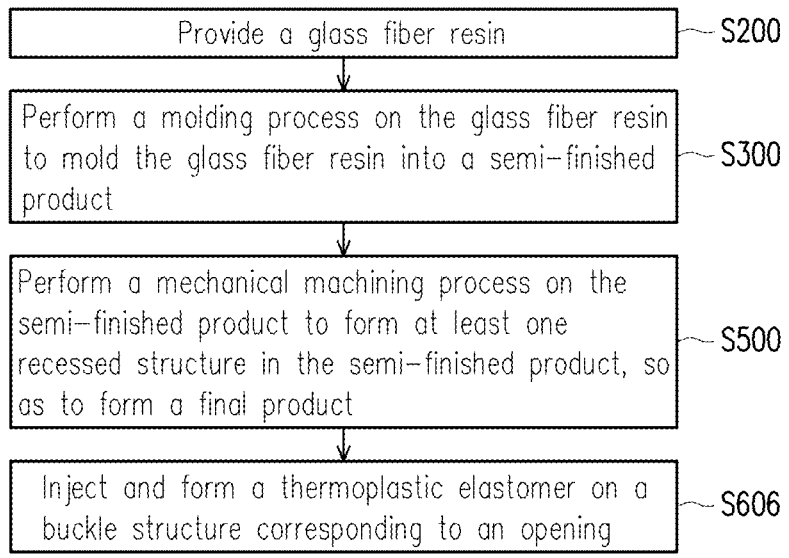

FIG. 10 and FIG. 11 are flowcharts of a manufacturing method of a glass fiber product according to other embodiments of the invention. Those steps in FIG. 10 and FIG. 11 that are similar to those in FIG. 1 are marked with the same reference numbers and will not be described in detail herein.

Referring to FIG. 1, FIG. 9, and FIG. 10, the difference between the manufacturing method of the final product 102 in FIG. 1 and the manufacturing method of the final product 102b in FIG. 10 is that in the latter one, an opening 107 and a connecting structure (not shown) corresponding to the opening 107 are further formed at the stress concentration position on the semi-finished product 100 in step S300. The opening 107 may be a slot, a groove, a broken hole, or a through hole. In the present embodiment, the opening 107 is a broken hole formed at the corner. The connecting structure may be a holder or a hook structure, and which increases the contact area between the semi-finished product 100 and the thermoplastic elastomer 106 (formed in the subsequent process) so that the bond between the semi-finished product 100 and the thermoplastic elastomer 106 is enhanced. The pattern of the connecting structure is not limited herein, and it is within the scope of the invention as long as the connecting structure can be effectively formed by using the mold.

Additionally, a step S406 is further comprised between step S300 and step S500. In step S406 the thermoplastic elastomer 106 is injected and formed on the connecting structure corresponding to the opening 107. Namely, the opening 107 is formed on the corner of the semi-finished product 100 by using the mold to provide a space for containing the thermoplastic elastomer 106, so that the semi-finished product 100 of high rigidity effectively connect with the thermoplastic elastomer 106 of high flexibility. Therefore the impact of any crash on the final product 102b is reduced by the the semi-finished product 100 and the thermoplastic elastomer 106.

Referring to FIG. 1, FIG. 9, and FIG. 11, the difference between the manufacturing method of the final product 102 in FIG. 1 and the manufacturing method of the final product 102b in FIG. 11 is that in the latter one, an opening 107 and a connecting structure (not shown) corresponding to the opening 107 are further formed at the stress concentration position on the final product 102 in step S500. The opening 107 may be a slot, a groove, a broken hole, or a through hole. In the present embodiment, the opening 107 is a broken hole formed on the corner. The connecting structure may be a holder or a hook structure. The connecting structure increases the contact area between the final product 102 and the thermoplastic elastomer 106 (formed in the subsequent process) so that the connection between the semi-finished product 100 and the thermoplastic elastomer 106 is enhanced. The pattern of the connecting structure is not limited herein, and it is within the scope of the invention as long as the connecting structure can be effectively formed by using the mold.

Additionally, a step S606 is further comprised after step S500. In step S606, the thermoplastic elastomer 106 is injected and formed on the connecting structure corresponding to the opening 107, so that the final product 102b is formed. Namely, after the semi-finished product 100 is formed, not only the recessed structure 104 is formed in the semi-finished product 100 through the mechanical machining process, but also the opening 107 is further formed on the corner to provide a space for containing the thermoplastic elastomer 106, so that the final product 102 of high rigidity effectively connects with the thermoplastic elastomer 106 of high flexibility and reduce the impact of any crash on the final product 102b.

As described above, the opening 107 and the connecting structure corresponding to the opening 107 can be formed during the molding process or the mechanical machining process. and the thermoplastic elastomer 106 can be formed after the semi-finished product 100 is formed or after the final product 102 is formed. Thereby, the manufacturing method of a glass fiber product provided by the invention can be adjusted according to the actual process or product requirement to offer improved applicability.

Moreover, as shown in FIG. 9, the opening 107 is formed on the external surface of the semi-finished product 100 or the final product 102, and the thermoplastic elastomer 106 is also formed on the external surface of the semi-finished product 100 or the final product 102. However, the invention is not limited thereto.

Figure 12:
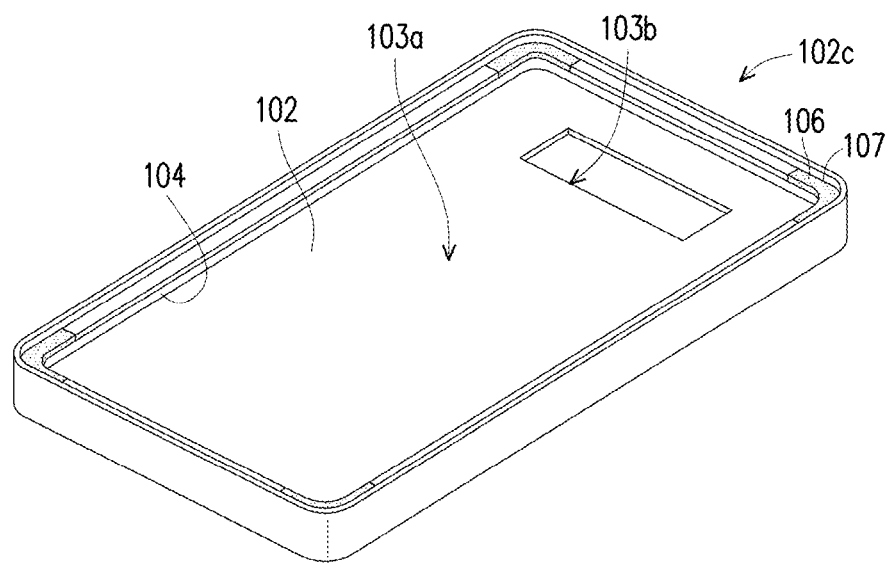
FIG. 12 is a perspective view of a glass fiber product according to still another embodiment of the invention.

FIG. 12 is a perspective view of a glass fiber product according to still another embodiment of the invention. Those components in FIG. 12 that are similar to those in FIG. 9 are marked with the same reference numbers and will not be described herein. It should be noted that FIG. 12 is only used for describing an embodiment of the invention but not intended to limit the scope of the invention.

Referring to both FIG. 9 and FIG. 12, the only difference between the final product 102b in FIG. 9 and the final product 102c in FIG. 12 is the disposed position of the thermoplastic elastomer 106. In FIG. 9, the thermoplastic elastomer 106 is formed on the external surface of the final product 102, while in FIG. 12, the thermoplastic elastomer 106 is formed inside the final product 102. In FIG. 12, the thermoplastic elastomer 106 is located at the corner of the final product 102c. However, the invention is not limited thereto, and it is within the scope of the invention as long as the thermoplastic elastomer(s) 106 is formed at any stress concentration position(s) on the final product 102c. Moreover, the final product 102c without the opening 107 and the connecting structure can be manufactured through the same method for manufacturing the final product 102b. Furthermore, according to requirement of the actual process or product, the opening 107 and the connecting structure corresponding to the opening 107 may also be formed on both the external surface and the inside of the semi-finished product 100 or the final product 102, and the thermoplastic elastomer 106 may also be formed on both the external surface and the inside of the semi-finished product 100 or the final product 102.

The glass fiber product manufactured through the method described in each of foregoing embodiments offers a rigidity similar to that of metal. In the manufacturing method, a semi-finished product is roughly formed through a molding process, and a final product is then formed through a mechanical machining process configured to form a few fine structures. Therefore the manufacturing cost can be effectively reduced, the manufacturing time can be shortened, and the production yield rate can be increased. The glass fiber product can be applied to the manufacturing of different portable electronic devices, such as notebook computers, tablet PCs, and cell phones.

Figure 13:
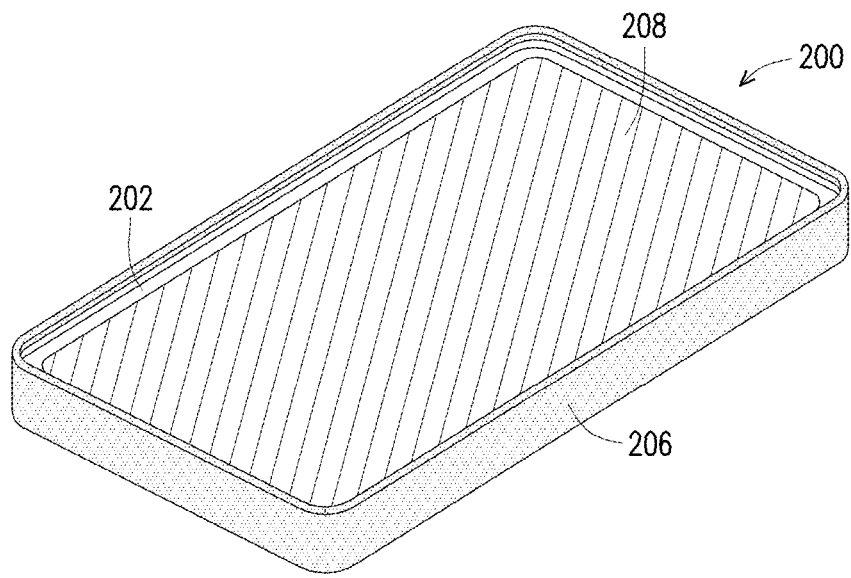
FIG. 13 is a diagram of a portable electronic device according to an embodiment of the invention.

FIG. 13 is a diagram of a portable electronic device according to an embodiment of the invention. It should be noted that FIG. 13 is only used for describing an embodiment of the invention but not intended to limit the scope of the invention.

Referring to FIG. 13, the portable electronic device 200 includes a casing 202, a thermoplastic elastomer 206, and a display device 208. The casing 202 has a containing space. Besides, the casing 202 includes a thermoplastic resin, a glass fiber, and an additive. The amount of the thermoplastic resin is between 30 wt % and 70 wt %, the amount of the glass fiber is between 40 wt % and 70 wt %, and the amount of the additive is between 0.1 wt % and 15 wt %. In the present embodiment, the casing 202 is the final product 102 in the embodiment described above, and the containing space is the containing space 103a in the embodiment described above.

The thermoplastic elastomer 206 is disposed at at least one stress concentration position on the casing 202. The thermoplastic elastomer 206 in the present embodiment is the thermoplastic elastomer 106 in the embodiment described above and will be described with reference to FIG. 4. However, the invention is not limited thereto. In other embodiments, the thermoplastic elastomer 106 illustrated in FIG. 8 or FIG. 11 may also be applied to the portable electronic device 200. And appropriate variations can be made by those having ordinary knowledge in the art according to the actual application requirement.

The display device 208 is disposed in the containing space. The display device 208 may be a touch screen or a display panel. The containing space in the present embodiment is the containing space 103a in the embodiment described above and will be described with reference to FIG. 4. However, the invention is not limited thereto. Referring to both FIG. 4 and FIG. 13. In the present embodiment, FIG. 4 is a diagram of the portable electronic device before the display device 208 is disposed in the containing space 103a, and FIG. 12 illustrates the portable electronic device after the display device 208 is disposed in the containing space 103a.

As described above, in the manufacturing method of a glass fiber product described in foregoing embodiments, a semi-finished product is first fabricated through a molding process based on the fact that the rigidity of a glass fiber resin is similar to that of a metal, and a final product is then manufactured through a mechanical machining process. Therefore the complexity of the mold is effectively reduced, the lifespan of the mold is prolonged, the manufacturing process is sped up, the manufacturing cost is reduced, and the production yield rate is increased. Additionally, in the manufacturing method of a glass fiber product provided by the invention, appropriate variations can be made according to the requirement of the actual process or product. Namely, the process flexibility and the applicability of the manufacturing method are both improved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A manufacturing method of a glass fiber product, comprising:
    providing a glass fiber resin, wherein the glass fiber resin comprises:
        a thermoplastic resin, having an amount between 35 wt % and 50 wt %;
        a glass fiber, having an amount between 45 wt % and 55 wt %; and
        an additive, having an amount between 0.1 wt % and 15 wt %;
    performing a molding process for the glass fiber resin to mold the glass fiber resin into a semi-finished product; and
    performing a mechanical machining process on the semi-finished product to form at least one recessed structure in the semi-finished product, so as to form a final product;
    wherein the manufacturing method further comprises a step of forming a thermoplastic elastomer at at least one stress concentration position on the semi-finished product or the final product.

2. The manufacturing method according to claim 1, wherein the thermoplastic elastomer is selected from a group consisting of polyamide (PA) thermoplastic elastomer, polyester thermoplastic elastomer, polyolefin thermoplastic elastomer, and styrene thermoplastic elastomer.

3. The manufacturing method according to claim 1, wherein a Shore hardness of the thermoplastic elastomer is between 40 Shore D and 80 Shore D.

4. The manufacturing method according to claim 1, wherein a Shore hardness of the thermoplastic elastomer is between 50 Shore A and 95 Shore A.

5. The manufacturing method according to claim 1, wherein the step of forming the thermoplastic elastomer comprises:
    injecting the thermoplastic elastomer at the at least one stress concentration position on the semi-finished product or the final product through an active binding procedure.

6. The manufacturing method according to claim 1, wherein the step of forming the thermoplastic elastomer comprises:
    forming a binding agent at the at least one stress concentration position of the semi-finished product or the final product, and then injecting the thermoplastic elastomer at the at least one stress concentration position on the semi-finished product or the final product.

7. The manufacturing method according to claim 1, wherein
    the molding process further comprises forming an opening and a connecting structure corresponding to the opening at the at least one stress concentration position on the semi-finished product; and
    the thermoplastic elastomer is formed on the connecting structure corresponding to the opening through an injection molding.

8. The manufacturing method according to claim 1, wherein
    the mechanical machining process further comprises forming an opening and a connecting structure corresponding to the opening at the at least one stress concentration position on the final product; and the thermoplastic elastomer is formed on the connecting structure corresponding to the opening through an injection molding.

9. The manufacturing method according to claim 8, wherein the opening and the connecting structure corresponding to the opening are formed on an external surface of the semi-finished product or the final product, and the thermoplastic elastomer is formed on the external surface of the semi-finished product or the final product.

10. The manufacturing method according to claim 8, wherein the opening and the connecting structure corresponding to the opening are formed inside the semi-finished product or the final product, and the thermoplastic elastomer is formed inside the semi-finished product or the final product.

11. The manufacturing method according to claim 8, wherein the opening and the connecting structure corresponding to the opening are formed on an external surface of and inside the semi-finished product or the final product, and the thermoplastic elastomer is formed on the external surface of and inside the semi-finished product or the final product.

12. The manufacturing method according to claim 1, wherein a material of the thermoplastic resin is selected from a group consisting of polycarbonate (PC), polyamide (PA), polypropylene (PP), acrylonitrile butadiene-styrene (ABS), polyphenyl ether (PPE), thermoplastic urethane (TPU), and polyphenylene sulphide (PPS).

13. The manufacturing method according to claim 1, wherein the glass fiber comprises one or a combination of a flat glass fiber and a round glass fiber.

14. The manufacturing method according to claim 1, wherein the additive is selected from a group consisting of a flame retardant, an antioxidant, a coupling agent, a processing aid, a toughener, a compatilizer, and a mineral filler.

15. The manufacturing method according to claim 1, wherein the mechanical machining process is performed by using a computer numerical control (CNC) machine.

* * * * *